(12) United States Patent
Cui et al.

(10) Patent No.: US 10,838,873 B2
(45) Date of Patent: Nov. 17, 2020

(54) METHOD, APPARATUS, AND COMPUTER PROGRAM PRODUCT FOR MANAGING ADDRESSES IN DISTRIBUTED SYSTEM

(71) Applicant: EMC IP Holding Company LLC, Hopkinton, MA (US)

(72) Inventors: Wei Cui, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/383,238

(22) Filed: Apr. 12, 2019

(65) Prior Publication Data
US 2019/0324917 A1  Oct. 24, 2019

(30) Foreign Application Priority Data
Apr. 20, 2018 (CN) .......................... 2018 1 0362380

(51) Int. Cl.
*G06F 12/10* (2016.01)
(52) U.S. Cl.
CPC ........ *G06F 12/10* (2013.01); *G06F 2212/657* (2013.01)

(58) Field of Classification Search
CPC .......................... G06F 12/10; G06F 2212/657
See application file for complete search history.

(56) References Cited

U.S. PATENT DOCUMENTS

| | | | |
|---|---|---|---|
| 6,480,943 B1 * | 11/2002 | Douglas | G06F 12/0607 711/127 |
| 2004/0049649 A1 * | 3/2004 | Durrant | G06F 9/30032 711/165 |
| 2018/0322387 A1 * | 11/2018 | Sridharan | G06N 3/084 |

* cited by examiner

*Primary Examiner* — Edward J Dudek, Jr.
(74) *Attorney, Agent, or Firm* — Ryan, Mason & Lewis, LLP

(57) ABSTRACT

There is provided a method for managing addresses in a distributed system. The distributed system comprises a client and a resource pool, the resource pool comprising multiple hosts, a host among the multiple hosts comprising a computing node. The method comprises: receiving an access request from the client, the access request being for accessing first target data in a physical memory of the computing node via a first virtual address; determining the physical memory on the basis of the first virtual address; and determining a first physical address of the first target data in the physical memory on the basis of the first virtual address, wherein the computing node is a graphics processing unit, and the physical memory is a memory of the graphics processing unit.

20 Claims, 12 Drawing Sheets

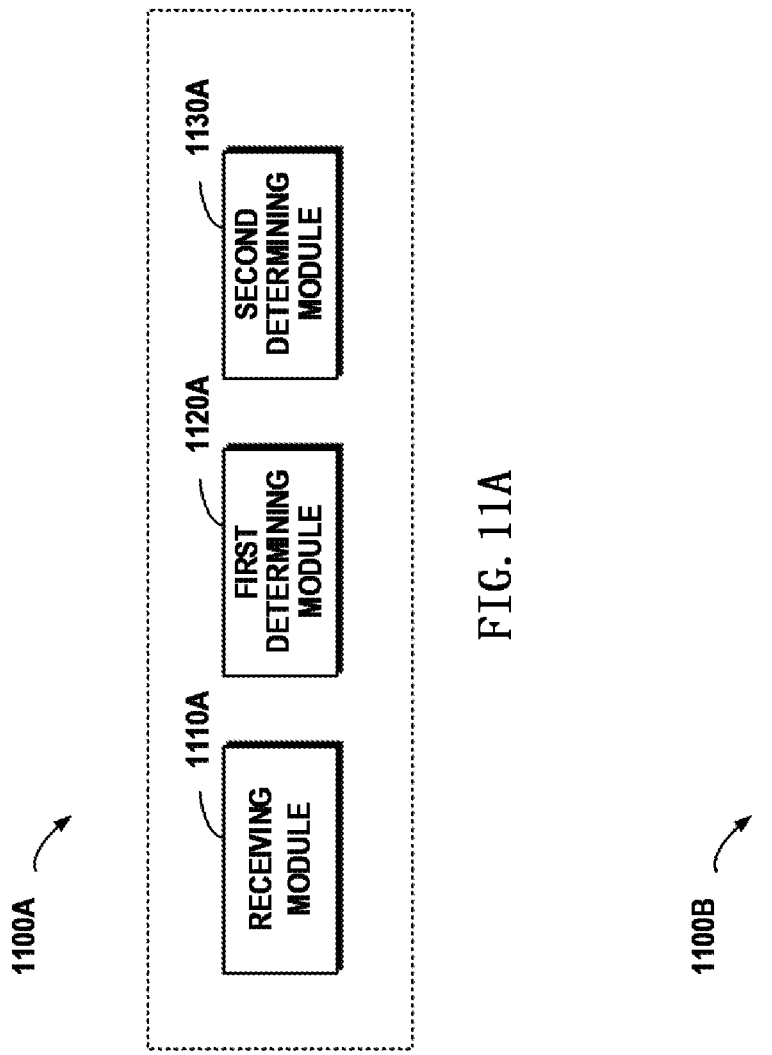
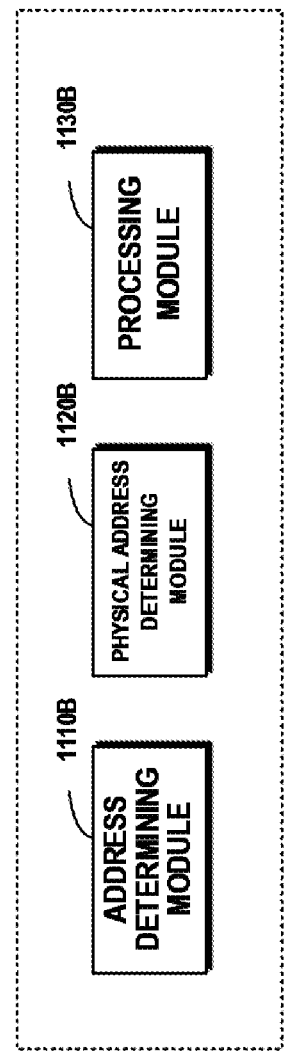
FIG. 11A
FIG. 11B

METHOD, APPARATUS, AND COMPUTER PROGRAM PRODUCT FOR MANAGING ADDRESSES IN DISTRIBUTED SYSTEM

RELATED APPLICATION(S)

The present application claims priority to Chinese Patent Application No. 201810362380.1, filed Apr. 20, 2018, and entitled "Method, Apparatus, and Computer Program Product for Managing Addresses in Distributed System," which is incorporated by reference herein in its entirety.

FIELD

Embodiments of the present disclosure generally relate to a distributed system, and more specifically, to a method, an apparatus and a computer program product for managing addresses in a distributed system.

BACKGROUND

Applications on the client can be designed to complete various processing or analyzing tasks using computing resources, such as processing and storage resources. As the requirement and complexity of the tasks such as machine learning, deep learning, and data mining continuously grow, it requires a large number of and/or variable computing nodes to satisfy operations of the corresponding application. This can be fulfilled by a machine or system having multiple computing nodes, where the application can be scheduled to operate on one or more computing nodes of the machine or system. For example, a cloud-based distributed system has already been developed, and this distributed system includes a machine having one or more computing nodes. Different clients can rent computing nodes (for example, computing nodes) of the system as required to operate their own applications.

With the development of computer technologies, there is an increasing variety of computing nodes, which are no longer limited to traditional ones like central processing units (CPUs). For example, the computing capacity of graphics processing units (GPUs) continues to grow. GPUs are particularly suitable to execute computing tasks such as in deep learning, high performance computing, machine learning by virtue of their distinctive properties. However, for ordinary client devices and conventional cloud computing devices, their GPUs are rather limited in performance and lack high-performance processing capacity. Currently, the question of how to process a computing task using the computing capacity of a GPU of another device (i.e., remotely) in a distributed system has become a focus of research.

However, some existing technical solutions fail to differentiate addresses of multiple computing nodes in a resource pool of a distributed system, not to mention concurrently call the processing capacity of the multiple computing nodes. As such, idleness of and/or workload unbalance between computing nodes might arise in the resource pool. Therefore, it is desirable to provide a technical solution for managing addresses in such a distributed system in an easy and effective way.

SUMMARY

Embodiments of the present disclosure provide a method, an apparatus and a corresponding computer program product for managing addresses in a distributed system.

According to a first aspect of the present disclosure, there is provided a method for managing addresses in a distributed system, the distributed system comprises a client and a resource pool, the resource pool comprises multiple hosts, a host among the multiple hosts comprising a computing node. The method comprises: receiving an access request from the client, the access request being for accessing first target data in a physical memory of the computing node via a first virtual address; determining the physical memory on the basis of the first virtual address; and determining a first physical address of the first target data in the physical memory on the basis of the first virtual address, wherein the computing node is a graphics processing unit, and the physical memory is a memory of the graphics processing unit. According to a second aspect of the present disclosure, there is provided a method for processing a copy request. The method comprises: in response to receiving a copy request from a client, determining a source virtual address and a destination virtual address which are associated with the copy request; by using the method according to the first aspect of the present disclosure, determining a source physical memory and a source physical address on the basis of the source virtual address and determining a destination physical memory and a destination physical address on the basis of the destination virtual address; and processing the copy request on the basis of the source physical memory and the destination physical memory.

According to a third aspect of the present disclosure, there is provided an apparatus for managing addresses in a distributed system, the distributed system comprising a client and a resource pool, the resource pool comprising multiple hosts, a host among the multiple hosts comprising a computing node. The apparatus comprises: at least one processor; a volatile memory; and a memory coupled to the at least one processor, the memory having instructions stored thereon, the instructions, when executed by the at least one processor, causing the apparatus to perform acts. The acts include: receiving an access request from the client, the access request being for accessing first target data in a physical memory of the computing node via a first virtual address; determining the physical memory on the basis of the first virtual address; and determining a first physical address of the first target data in the physical memory on the basis of the first virtual address, wherein the computing node is a graphics processing unit, and the physical memory is a memory of the graphics processing unit.

According to a fourth aspect of the present disclosure, there is provided an apparatus for processing a copy request, comprising: at least one processor; an apparatus for managing addresses in a distributed system; a volatile memory; and a memory coupled to the at least one processor, the memory having instructions stored thereon, the instructions, when executed by the at least one processor, causing the apparatus to perform acts. The acts include: in response to receiving a copy request from a client, determining a source virtual address and a destination virtual address which are associated with the copy request; by using the apparatus according to the third aspect of the present disclosure, determining a source physical memory and a source physical address on the basis of the source virtual address and determining a destination physical memory and a destination physical address on the basis of the destination virtual address; and processing the copy request on the basis of the source physical memory and the destination physical memory.

According to a fifth aspect of the present disclosure, there is provided a computer program product. The computer program product is tangibly stored on a computer readable medium and comprises machine executable instructions which, when executed, cause the machine to implement a method according to the first aspect of the present disclosure.

According to a sixth aspect of the present disclosure, there is provided a computer program product. The computer program product is tangibly stored on a computer readable medium and comprises machine executable instructions which, when executed, cause the machine to implement a method according to the second aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

FIG. 11A schematically shows a block diagram of an apparatus for managing addresses according to one example embodiment of the present disclosure;

FIG. 11B schematically shows a block diagram of an apparatus for processing a copy request according to one example embodiment of the present disclosure.

DETAILED DESCRIPTION

The preferred embodiments of the present disclosure will be described in more detail with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can comprise other explicit and implicit definitions.

As described above, computing nodes can be provided locally at the client or by a remote machine or system. In some examples, a cloud-based computing system may be deployed, which includes a plurality of machines having one or more computing nodes. The computing nodes of the computing system can be utilized by different clients based on their needs to dispatch the corresponding applications to operate on available computing nodes.

Figure 1:
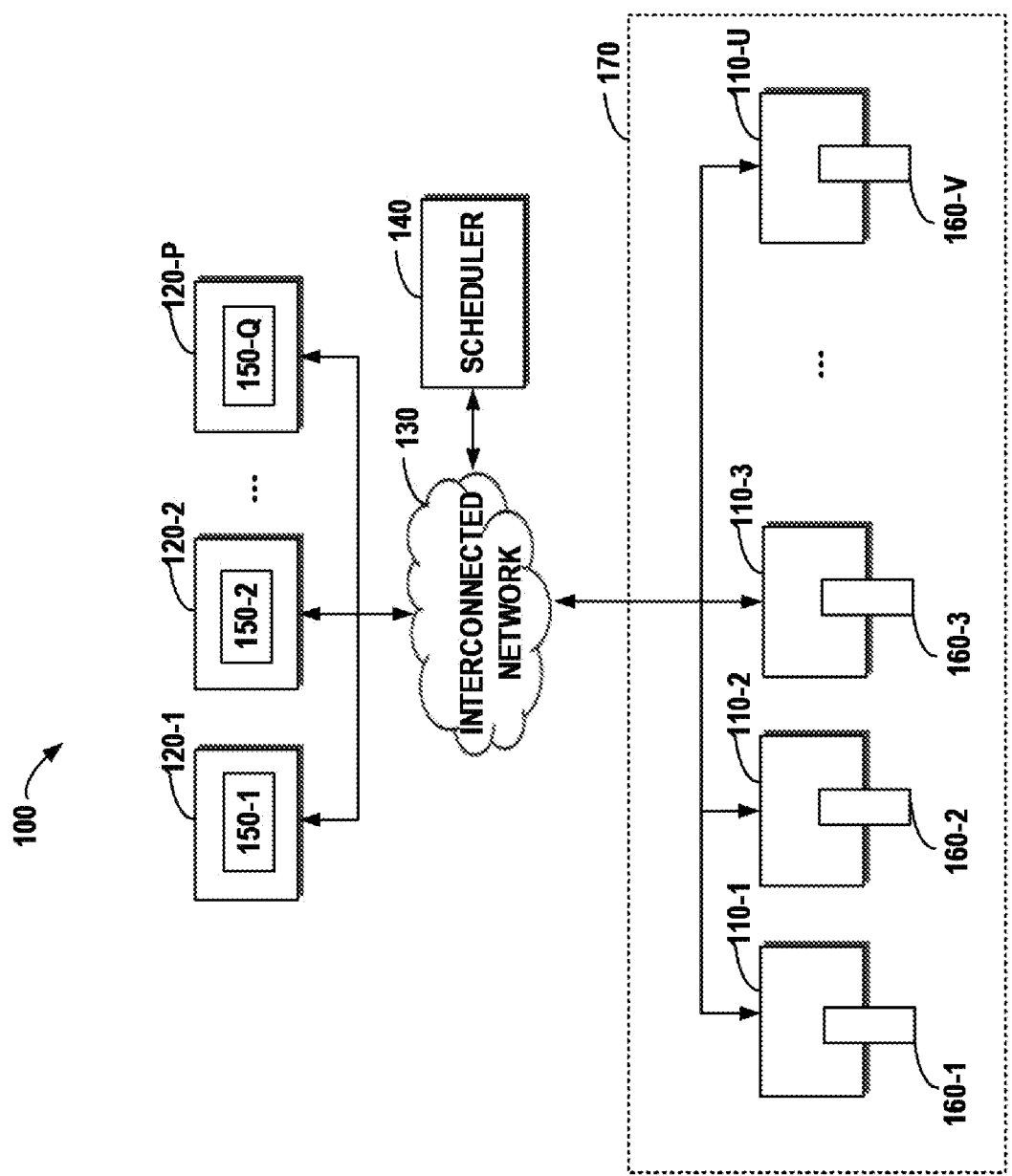
FIG. 1 schematically shows a block diagram of an example distributed system in which some embodiments of the present disclosure can be implemented.

FIG. 1 is a schematic diagram illustrating an example distributed computing system 100 in which embodiments of the present disclosure can be implemented. The computing system 100 may comprise a resource pool 170, and a plurality of hosts for running applications, including a host 110-1, a host 110-2, a host 110-3, . . . , a host 110-U (hereinafter collectively referred to as a host 110, wherein U is a natural number greater than 1), are deployed in the computing system 100. The computing system 100 further includes a computing node 160-1, a computing node 160-2, a computing node 160-3, . . . , a computing node 160-V (hereinafter collectively referred to as a computing node 160, wherein V is a natural number greater than 1). Each host 110 has one or more computing nodes 160.

In the example of FIG. 1, the host 110-1 has the computing node 160-1, the host 110-2 has the computing node 160-2, the host 110-3 has the computing node 160-3, and the host 110-U has the computing node 160-V. It will be understood that each host is not limited to have only one computing node, but one host may have one or more computing nodes. Therefore, here the value of U may not equal that of V.

Throughout the context of the present disclosure, examples of the computing node 160 may include, but not limited to, a GPU, a field programmable gate array (FPGA), or the like. For the sake of discussion, some embodiments will take GPU as the example of the dedicated processing resources. In addition to the computing node 160, the host 110 may further include, for example, one or more general processing units such as a central processing unit (CPU) (not shown).

FIG. 1 further illustrates a plurality of clients 120-1, 120-2, . . . , 120-P (hereinafter collectively or individually referred to as a client 120, wherein P is a natural number greater than 1) respectively having applications 150-1, 150-2, . . . , 150-Q (hereinafter collectively referred to as an application 150, wherein Q is a natural number greater than 1) to run. The application 150 may be any application running on the machine, and the application can be designed to perform corresponding data processing or analyzing tasks. As an example, the application 150 can perform data processing or analyzing tasks associated with high performance computing (HPC), machine learning (ML) or deep learning (DL), and artificial intelligence (AI), and/or the like. It will be appreciated that each client is not limited to having only one application, but one client may have one or more applications. Therefore, here the value of P may not equal that of Q.

To quickly and efficiently run these applications and/or save local computing resources, the client 120 may request the computing node 160 of the host 110 to run these applications 150. In such an embodiment, the client 120 may be connected via an interconnected network 130 to one or more hosts 110 and hand over the application 150 to run by one or more computing nodes 160 of the host 110. The interconnected network 130 can support different types of wired or wireless connections based on various network transmission techniques, for example, remote direct memory access (RDMA), transmission control protocol (TCP) or the like, depending on interfaces supported by the client 120, the host 110 and/or the computing node 160.

It should be understood that the device and/or arrangement as shown in FIG. 1 is provided as an example only. In other examples, the distributed computing system 100 can include any suitable number of hosts 110 and clients 120. Each host 110 can have any suitable number of computing nodes 160, and each client 120 can have a plurality of applications 150 to run. In addition, a scheduler 140, although separately shown, can be implemented by other devices independent of the host 110 in the practical application, or can be implemented partially or entirely on one or more hosts 110.

To describe in a clear and concise manner, example embodiments of the present disclosure will be described in detail by mainly taking the GPU kernel as an example. However, it should be understood that GPU is only an example computing node and shall not limit the scope of the present disclosure. Spirits and principles described herein can be applied to other computing nodes, for example, computing nodes in an accelerator such as an FPGA currently known or to be developed in the future, without being limited to the GPU kernel only.

In the distributed system as shown in FIG. 1, various computing nodes 160 are independent of each other, and respective memories in various computing nodes 160 are all similar to the memory in a single computing node 160. When the application 150 at the client 120 simultaneously calls multiple computing nodes 160 to execute treatment, address ranges of memories in various computing nodes 160 might overlap with each other.

Figure 2:
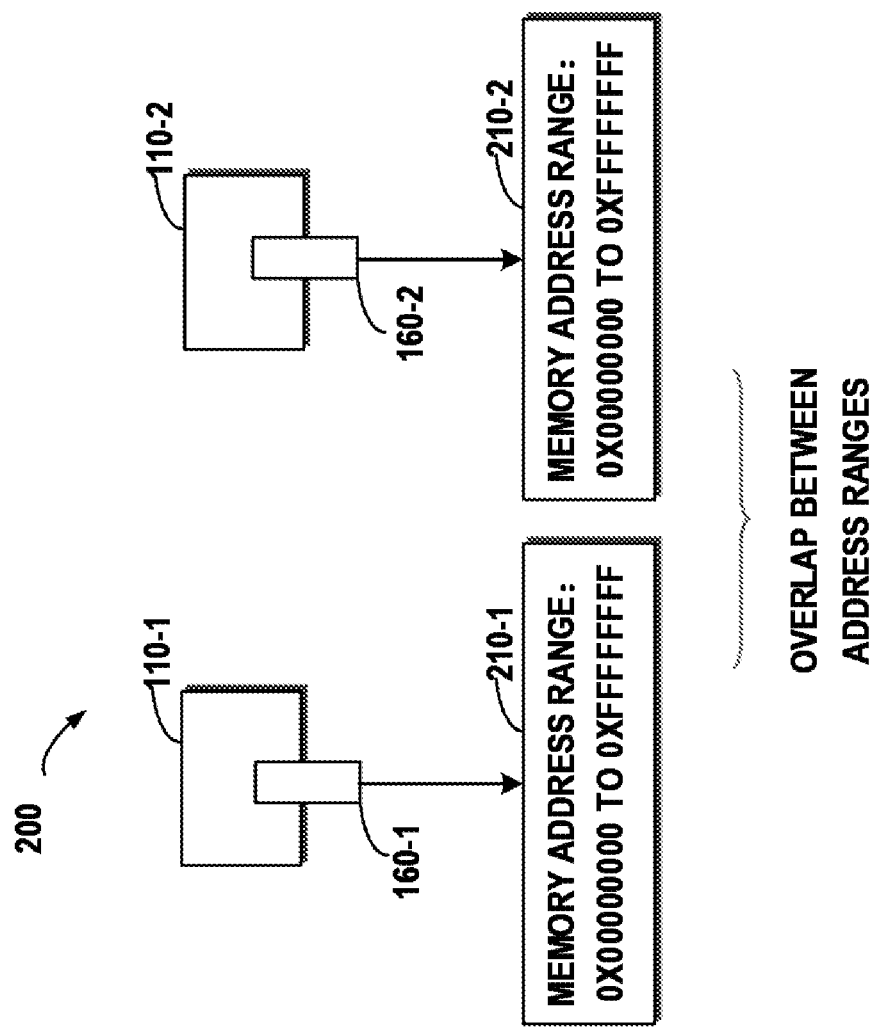
FIG. 2 schematically shows a block diagram for managing addresses in a distributed system according to one technical solution.

FIG. 2 schematically shows a block diagram 200 for managing addresses in the distributed system 100 according to one technical solution. FIG. 2 depicts two computing nodes 160-1 and 160-2, and assumes memories in the two nodes have the same configuration. At this point, address ranges 210-1 and 210-2 of memories in the two computing nodes 160-1 and 160-2 are the same, and both are 0x00000000 to 0xFFFFFFFF. This will lead to an overlap between address ranges of two memories. At this point, when an access request indicates to access data at a target address (e.g. 0x33000000), it is impossible to distinguish the computing node whose memory includes the target address in the distributed system 100. It will be understood that while FIG. 2 illustrates the address overlap between only two computing nodes, when the distributed system 100 comprises more computing nodes 160, the address overlap will occur to any two of the computing nodes 160.

In view of the drawbacks of the prior art, it is desirable to develop a technical solution for managing addresses in the distributed system 100 more accurately and effectively. According to one example embodiment of the present disclosure, there is provided a method for processing an access request in a distributed system 100. Here, the distributed system 100 comprises a client 120 and a resource pool 170, the resource pool 170 comprising multiple hosts 110 among which a host comprises a computing node 160.

Figure 3:
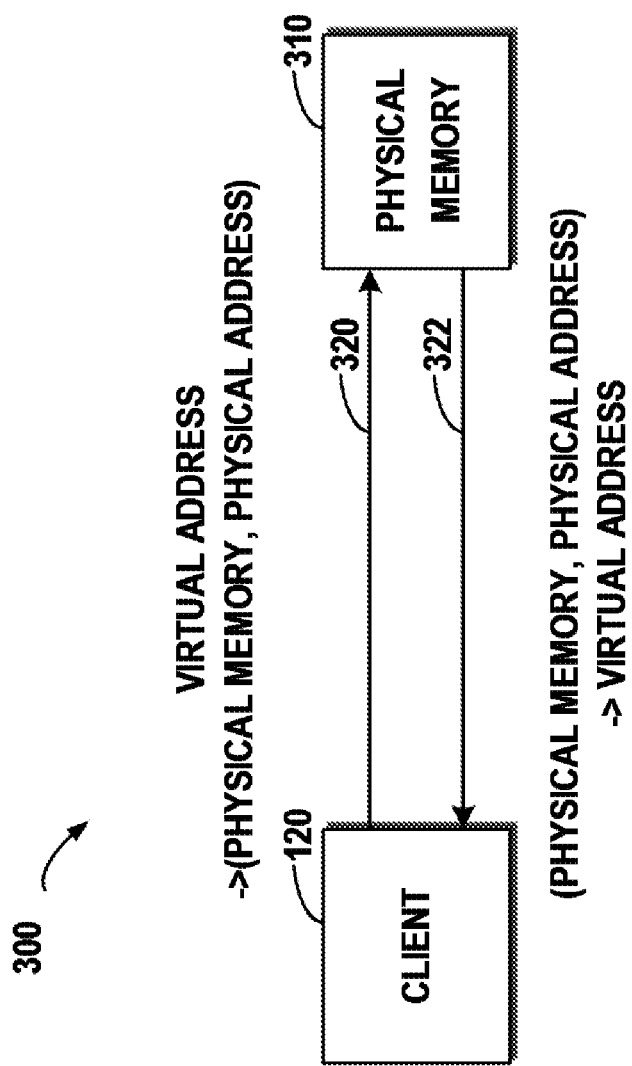
FIG. 3 schematically shows a block diagram for managing addresses in a distributed system according to one example embodiment of the present disclosure.

In the distributed system 100, an access request may be received from the client 120, here the access request being for accessing first target data in a physical memory of the computing node via a first virtual address. Subsequently, the physical memory may be determined on the basis of the first virtual address, and a first physical address of the first target data in the physical memory may be determined on the basis of the first virtual address. In this example embodiment, the computing node 160 may be a GPU, and the physical memory is a memory of the GPU. With reference to FIG. 3, a detailed description is presented below to provide more details about operations of determining the physical memory and the physical address on the basis of the virtual address.

FIG. 3 schematically shows a block diagram 300 for managing addresses in the distributed system 100 according to one example embodiment of the present disclosure. As depicted, a storage position of data is described as a virtual address at the client 120, and a physical memory 310 uses an identifier thereof and a physical address therein to describe a storage position of data. An address indicated by the access request from the client 120 may be a virtual address. The identifier of the physical memory 310 and the corresponding physical address may be determined on the basis of the virtual address through an operation as shown by an arrow 320 in FIG. 3, so as to be used by the physical memory 310. As shown by an arrow 322, when a feedback result is received from the physical memory 310, the virtual address may be determined on the basis of the identifier of the physical memory 310 and the physical address, so as to be used by the client 120. It will be understood that the length of addressable bits of the virtual address and the physical address as denoted in the present method includes, but is not limited to, 32 bits, 64 bits and 128 bits, and depending on a specific application environment, the virtual address and the physical address may include a larger or smaller length.

Figure 4:
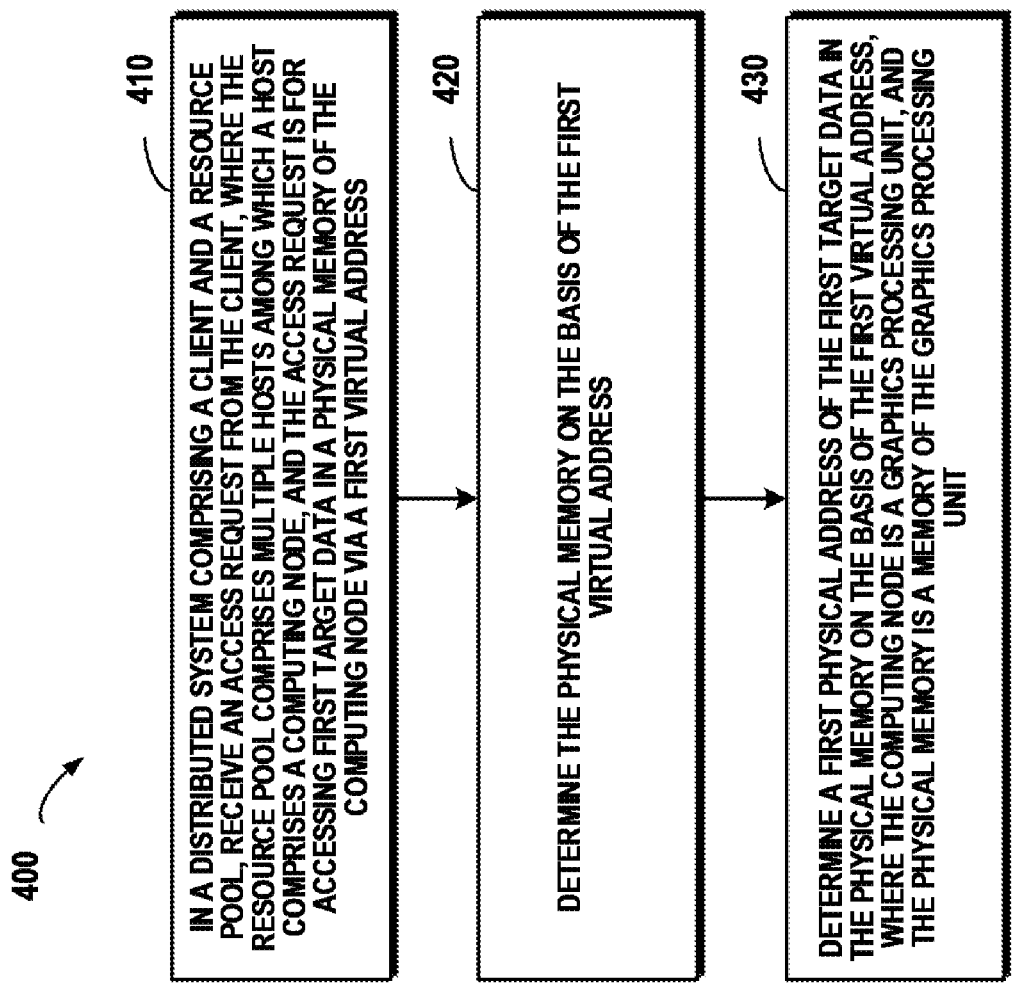
FIG. 4 schematically shows a flowchart of a method for managing addresses in a distributed system according to one example embodiment of the present disclosure.

FIG. 4 schematically shows a flowchart of a method 400 for managing addresses in the distributed system according to one example embodiment of the present disclosure. In a block 410, an access request is received from a client, here the access request is for accessing first target data in a physical memory of a computing node via a first virtual address. In a block 420, a physical memory is determined on the basis of the first virtual address. In a block 430, a first physical address of the first target data in the physical memory is determined on the basis of the first virtual address, wherein the computing node is a graphics processing unit, and the physical memory is a memory of the graphics processing unit.

In this embodiment, by converting between the virtual address and the physical address, memories in different computing nodes 160 in the distributed system 100 may be distinguished. Further, a real physical address of the target data to which the access request points may be determined precisely. Multiple approaches may be used to convert the virtual address into the physical address. In one straightforward embodiment, when converting the physical address into the virtual address, an identifier of the physical memory and the physical address may be spliced to form the virtual address; when converting the virtual address into the physical address, the virtual address may be divided to determine the identifier of the physical memory and the physical address.

According to one example embodiment of the present disclosure, the conversion between the virtual address and the physical address may be implemented on the basis of an address mapping. To determine the physical memory on the basis of the first virtual address, an address range to which the first virtual address belongs may be determined on the basis of a predefined address mapping, the address mapping comprising a mapping relationship between the physical memory and the address range. In this embodiment, the conversion between the virtual address and the physical address may be implemented simply by the address mapping, and the conversion process will not involve a large amount of calculation.

Figure 5:
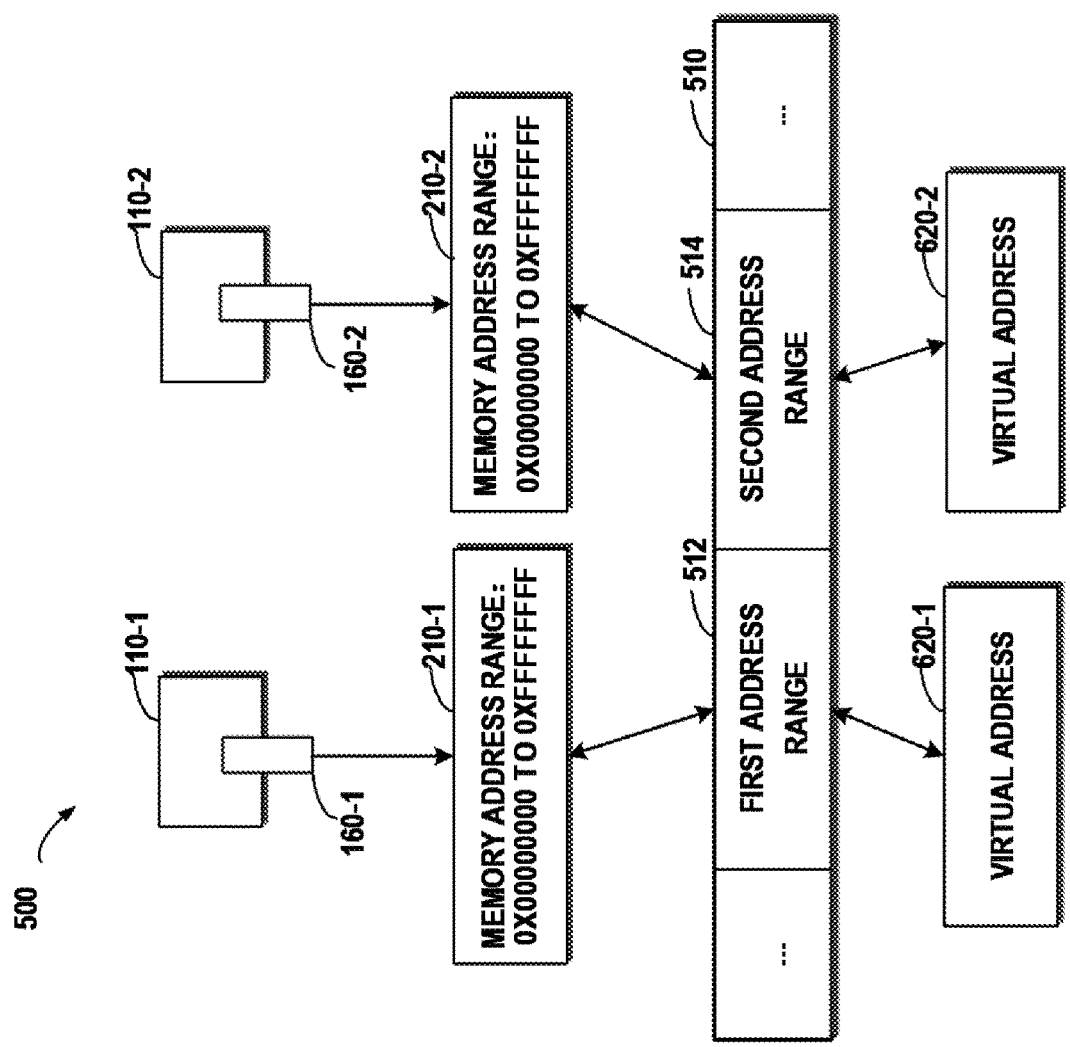
FIG. 5 schematically shows a block diagram of a mapping relationship between a physical address and a virtual address according to one example embodiment of the present disclosure.

With reference to FIG. 5, a description is presented below with further illustrative details. FIG. 5 schematically shows a block diagram 500 of a mapping relationship between a physical address and a virtual address according to one example embodiment of the present disclosure. As depicted, both address ranges 210-1 and 210-2 of memories in the two computing nodes 160-1 and 160-2 are 0x00000000 to 0xFFFFFFFF and overlap with each other. To solve the overlap between the address ranges, a virtual address space 510 may be provided, and the two address ranges 210-1 and 210-2 may be mapped to a first address range 512 and a second address range 514 respectively.

It will be understood although FIG. 5 only illustrates a diagram of memories in the two computing nodes 160-1 and 160-2, according to one example embodiment of the present disclosure, address ranges may be set for the multiple computing nodes 160 in the resource pool respectively. Although in FIG. 5 the first address range 512 and the second address range 514 are continuous address ranges, in other example embodiment, multiple address ranges may be continuous or discontinuous. Throughout the context of the present disclosure, it is not intended to limit whether various address ranges are continuous or not, so long as they do not overlap with each other and can accommodate address ranges associated with memories in various computing nodes.

According to one example embodiment of the present disclosure, the size of the first address range 512 and the second address range 514 may be set to 1 terabyte (TB) or some other value. It will be understood that the available address space of a memory of the computing node 160, like the GPU, is far less than 1 TB. Further, with the development of hardware technologies, it is estimated that the available address space of a memory of the GPU will not reach the order of magnitude of 1 TB in the coming several years. Therefore, to set the size of various address ranges to 1 TB is secure and feasible.

Figure 6:
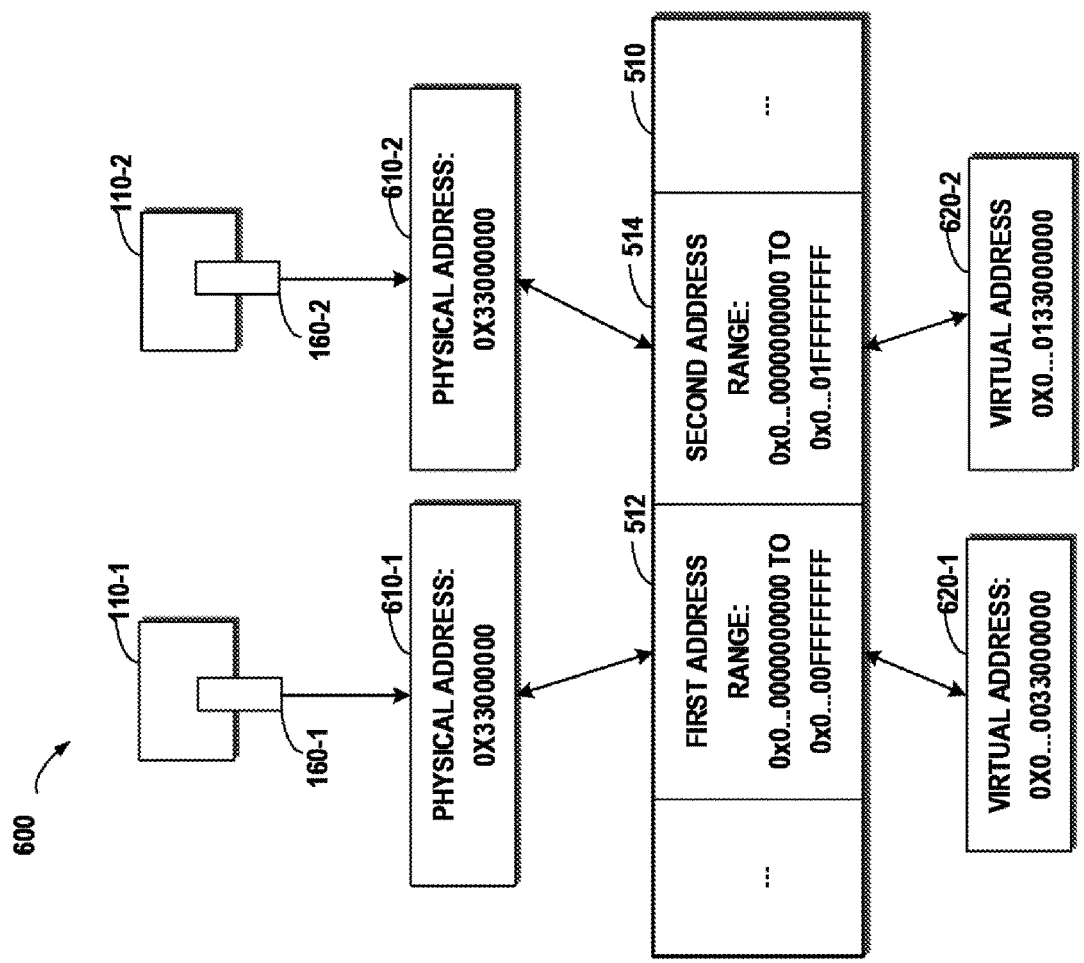
FIG. 6 schematically shows a block diagram for mapping between a physical address and a virtual address according to one example embodiment of the present disclosure.

With reference to FIG. 6, more illustrative details are presented below. FIG. 6 schematically shows a block diagram 600 for mapping between a physical address and a virtual address according to one example embodiment of the present disclosure. As depicted, a physical memory may be determined on the basis of an address range. For example, regarding a virtual address 620-1, the virtual address is represented as a value "0x0 . . . 0033000000" in the virtual address space 510. At this point, as seen from the address mapping relationship, the virtual address 620-1 belongs to the first address range 512, and the address range is associated with a memory of the computing node 160-1. Therefore, at this point it may be determined that a physical storage device associated with the virtual address 620-1 is a physical memory of the computing node 160-1.

For another example, regarding a virtual address 620-2, the virtual address is represented as a value "0x0 . . . 0133000000" in the virtual address space 510. At this point, as seen from the address mapping relationship, the virtual address 620-2 belongs to the second address range 514, and the address range is associated with a memory of the computing node 160-2. Therefore, at this point it may be determined that a physical storage device associated with the virtual address 620-2 is a physical memory of the computing node 160-2.

According to one example embodiment of the present disclosure, the first physical address may be determined on the basis of an offset of the first virtual address within the address range. Still with reference to FIG. 6, regarding the virtual address 620-1, it has been determined that the virtual address corresponds to a physical memory of the computing node 160-1, at which point a physical address 610-1 associated with the virtual address 620-1 may be determined on the basis of an offset of the virtual address 620-1 within the first address range 512. It may be determined that target data associated with the virtual address 620-1 are on a physical memory of the computing node 160-1, and the physical address is 610-1.

Regarding the virtual address 620-2, it has been determined that the virtual address corresponds to a physical memory of the computing node 160-2, at which point a physical address 610-2 associated with the virtual address 620-2 may be determined on the basis of an offset of the virtual address 620-2 within the second address range 514. It may be determined that target data associated with the virtual address 620-2 are on a physical memory of the computing node 160-2, and the physical address is 610-2.

While how to determine a physical memory and a physical address in the physical memory on the basis of a virtual address has been described above, further description is presented below on how to determine a virtual address on the basis of a physical memory and a physical address in the physical memory. After receiving a feedback result from the physical memory, a virtual address associated with a physical address in the physical memory may be defined on the basis of the feedback result. It will be understood that determining a virtual address on the basis of a physical memory and a physical address is the reverse process of determining a physical address on the basis of a virtual address. The virtual address associated with the feedback result may be determined on the basis of the predefined address mapping, the physical memory and the physical address, so as to be returned to the client 120.

Still with reference to FIG. 6, to convert the physical address 610-1 of the physical memory of the computing node 160-1 into a virtual address, the first address range 512 associated with the physical memory may be determined according to the address mapping, and a start address of the first address range 512 may be determined as "0x0 . . . 0000000000." Subsequently, the physical address 610-1 may be offset on the basis of the start address, so as to determine the virtual address 620-1. At this point, the determined virtual address 620-1 is "0x0 . . . 0033000000."

Further, to convert the physical address 610-2 of the physical memory of the computing node 160-2 into a virtual address, the second address range 514 associated with the physical memory may be determined according to the address mapping, and a start address of the second address range 514 may be determined as "0x0 . . . 0100000000."

Subsequently, the physical address 610-2 may be offset on the basis of the start address, so as to determine the virtual address 620-2. At this point, the determined virtual address 620-2 is "0x0 . . . 0133000000."

According to one example embodiment of the present disclosure, the access request is a remote procedure call (abbreviated as RPC) of the GPU from the client. In this embodiment, the application 150 running on the client 120 may conveniently call various resources in the resource pool 170 through a remote procedure call.

Figure 7:
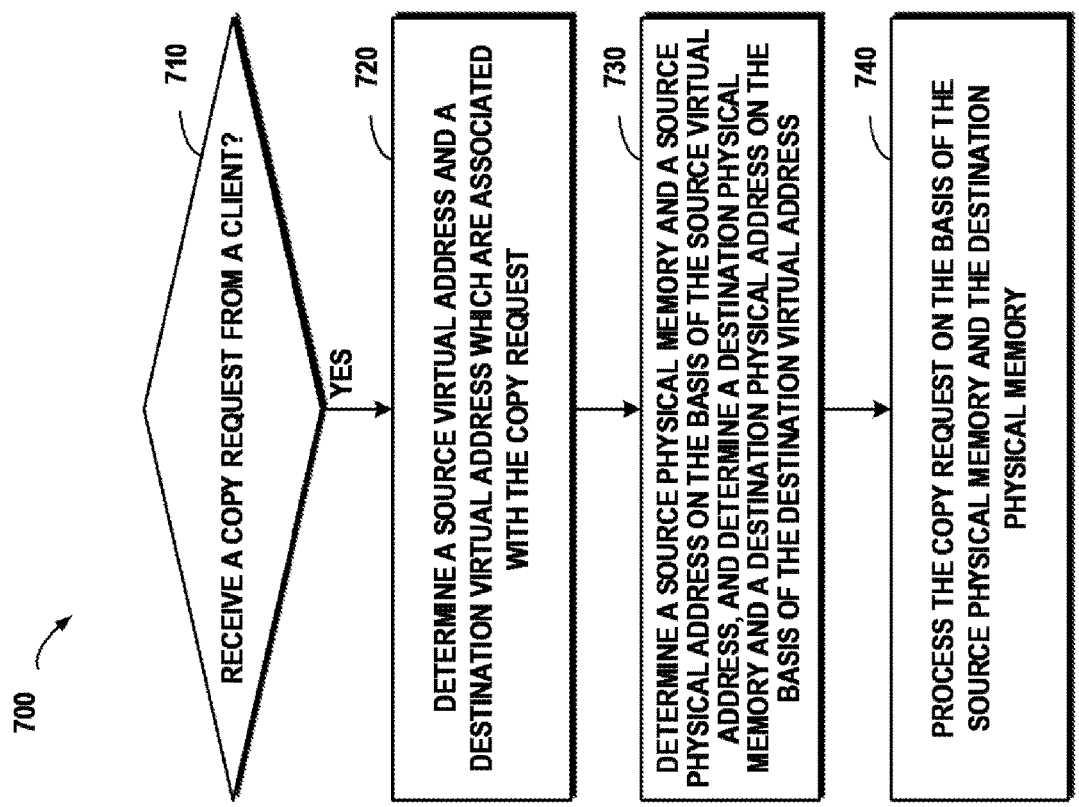
FIG. 7 schematically shows a flowchart of a method for processing a copy request according to one example embodiment of the present disclosure.

The process of the technical solution for converting between a virtual address and a physical address has been described with reference to FIGS. 2 to 6. Hereinafter, a description will be presented on how to execute a data copy operation in the distributed system 100 on the basis of the above-described address conversion method. According to one example embodiment of the present disclosure, there is provided a method for processing a copy request. FIG. 7 schematically shows a flowchart of a method 700 for processing a copy request according to one example embodiment of the present disclosure. In a block 710, it may be determined whether a copy request is received from the client 120, and if the decision result is yes, then the flow proceeds to a block 720. In the block 720, a source virtual address and a destination virtual address which are associated with the copy request are determined. In different systems, copy requests may have different formats. Therefore, a source virtual address and a destination virtual address involved in the copy request may be determined on the basis of the definition of the copy request. It will be understood that although only an example of executing a data copy operation has been described, according to one example embodiment of the present disclosure, the method may be applied to a data move operation likewise.

Next in a block 730, a physical address involved in the copy request may be determined using the above described method. Specifically, a source physical memory and a source physical address may be determined on the basis of the source virtual address, and a destination physical memory and a destination physical address may be determined on the basis of the destination virtual address. Those skilled in the art may determine the corresponding physical address with reference to the above described method, which is not further described here. In a block 740, the copy request may be processed on the basis of the source physical memory and the destination physical memory.

Figure 8:
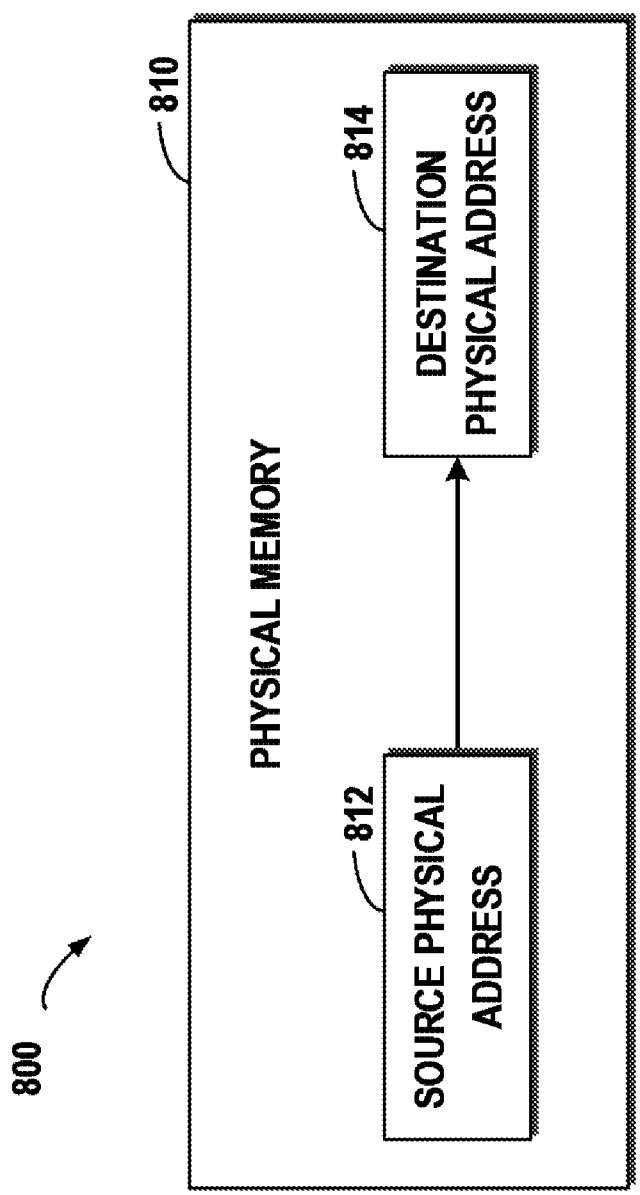
FIGS. 8 to 10 each schematically show a block diagram for processing a copy request according to one example embodiment of the present disclosure.
Figure 9:
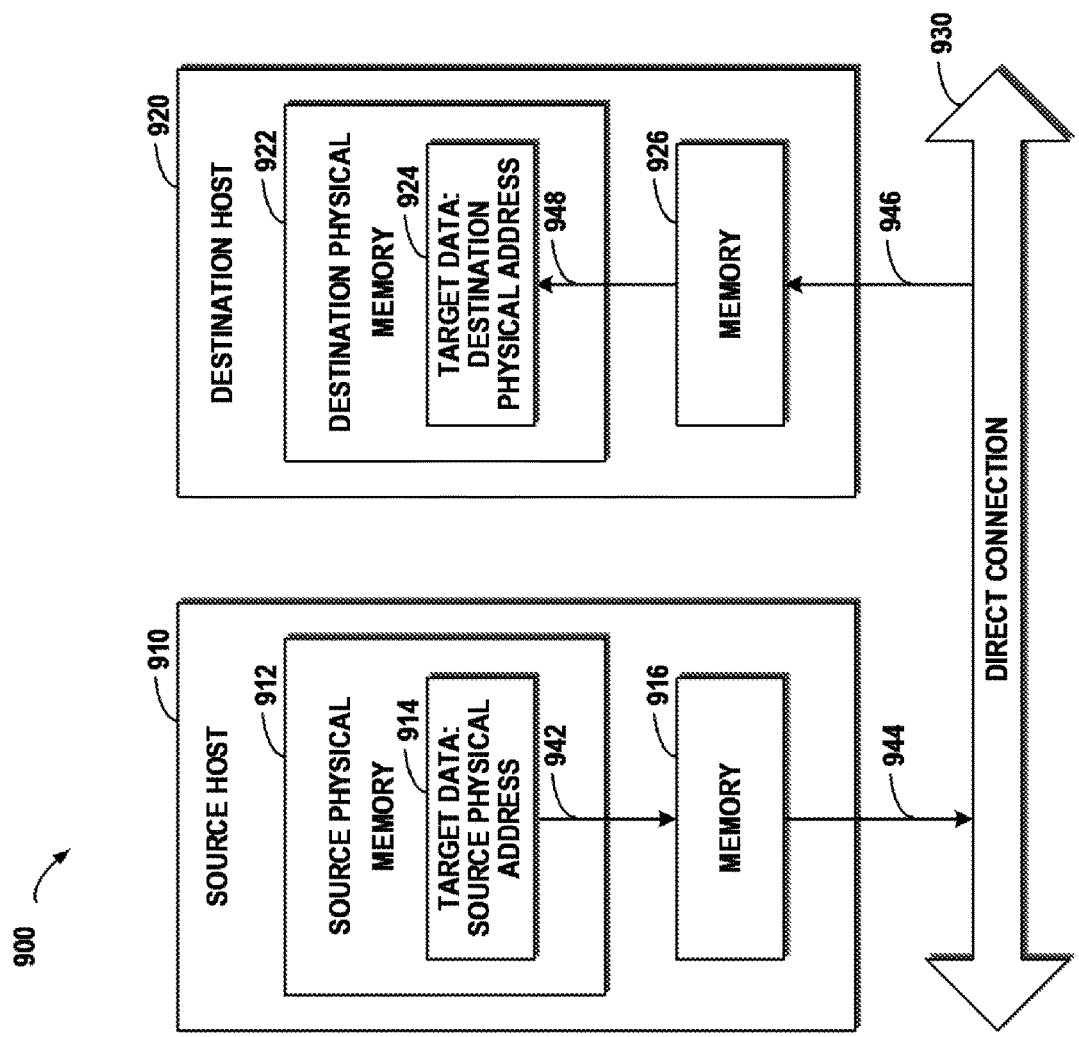
Figure 10:
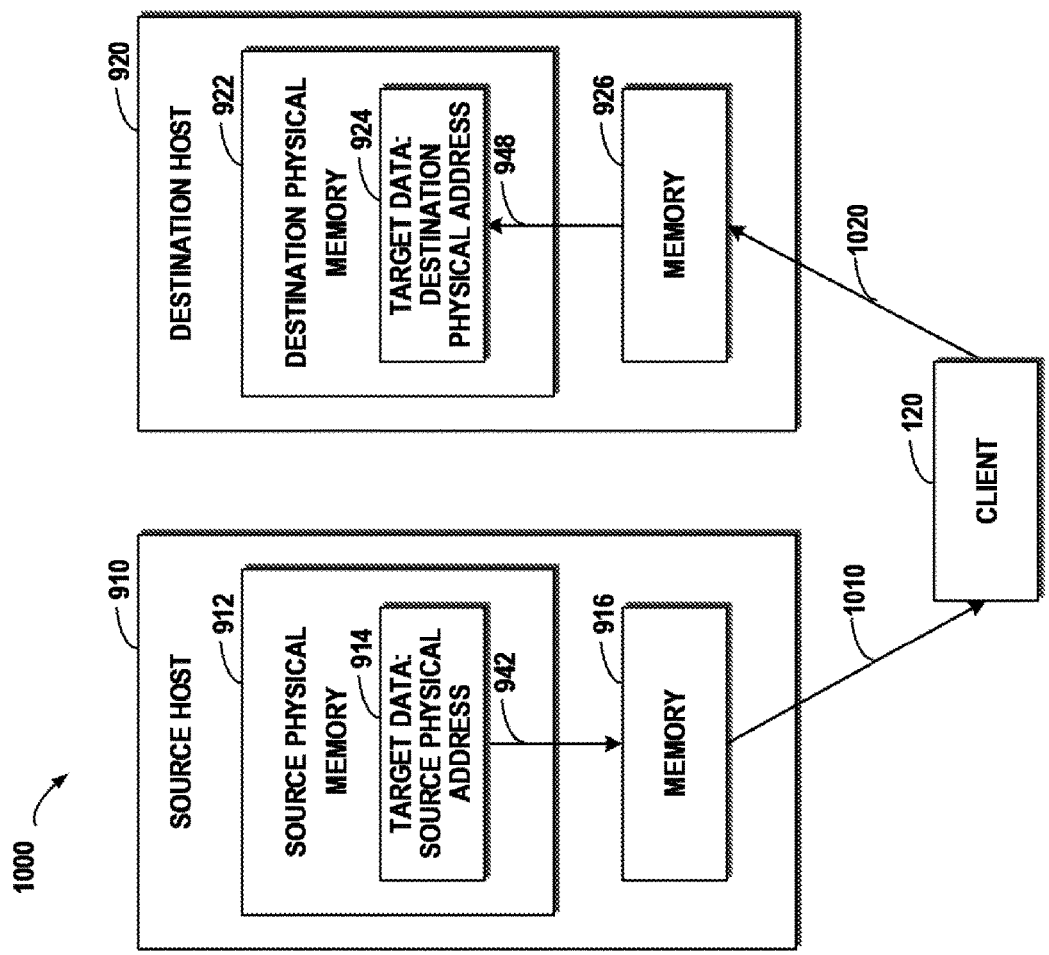

It will be understood that there may exist a plurality of different processing approaches depending on whether the source physical memory and the destination physical memory are the same physical device and whether there is a direct connection between the two devices. With reference to FIGS. 8 to 10, a detailed description is presented on how to process the copy request on the basis of the source physical memory and the destination physical memory.

According to one example embodiment of the present disclosure, if it is determined that the source physical memory and the destination physical memory are same, then a data copy may be executed in the same physical memory. At this point, at the source physical memory, target data associated with the copy request are copied from the source physical address to the destination physical address. With reference to FIG. 8, description is presented below to data copy in this case. FIG. 8 schematically shows a block diagram 800 for processing a copy request according to one example embodiment of the present disclosure. As depicted, at this point the source physical memory and the destination physical memory are the same, and both are denoted by a reference numeral 810. A source physical address 812 and a destination physical address 814 are addresses in the same physical memory, and further data copy may be executed in the physical memory 810 directly.

According to one example embodiment of the present disclosure, if it is determined that the source physical memory and the destination physical memory are different, then a connection state between a source host where the source physical memory resides and a destination host where the destination physical memory resides needs to be determined, and the copy request is processed on the basis of the connection state. In this embodiment, the connection state means whether there is a direct connection between the source host and the destination host.

With reference to FIG. 9, description is presented below to a data copy operation when there is a direct connection. FIG. 9 schematically shows a block diagram 900 for processing a copy request according to one example embodiment of the present disclosure. As depicted, a source physical memory 912 resides at a source host 910, and the source host 910 has a memory 916. A destination physical memory 922 resides at a destination host 920, and the destination host 920 has a memory 926. Between the source host 910 and the destination host 920 there exists a direct connection 930, via which target data 914 at a source physical address may be copied to obtain target data 924 at a destination address.

To execute a data copy, the target data 914 associated with the copy request may be copied from the source physical address (as shown by an arrow 942) in the source physical memory 912 to the memory 916 of the source host 910 to form first intermediate data. Next, the intermediate data may be copied (as shown by arrows 944 and 946) via the direct connection 930 to the memory 926 of the destination host 920 to form second intermediate data. Subsequently, the second intermediate data are copied (as shown by arrow 948) to the destination physical address in the destination physical memory 922 to obtain the target data 924 at the destination address.

According to one example embodiment of the present disclosure, there might not exist a direct connection between the memory 916 and the memory 926, at which point a data copy is executed by means of the client 120. With reference to FIG. 10, description is presented below to a data copy operation when there is no direct connection. FIG. 10 schematically shows a block diagram 1000 for processing a copy request according to one example embodiment of the present disclosure. The copy process shown in FIG. 10 is similar to the example in FIG. 9, and the difference is that in FIG. 10 the copy is executed via the client 120. For example, the target data 914 associated with the copy request may be copied (as shown by arrows 942 and 1010) from the source physical address in the source physical memory 912 to the client 120 to form intermediate data. Subsequently, the intermediate data are copied (as shown by arrows 1020 and 948) to the destination physical address in the destination physical memory 922 to obtain the target data 924 at the destination address.

To effect the target data copy to the client 120, the target data may be copied from the source physical address in the source physical memory 912 to the memory 916 of the source host 910 (as shown by the arrow 942) to form first intermediate data. Then, the first intermediate data are copied to the client 120 (as shown by arrow 1010). Further, to copy the intermediate data from the client 120 to the destination physical memory 922, the intermediate data may be copied (as shown by arrow 1020) from the client 120 to the memory 926 of the destination host 920 to form second intermediate data. Subsequently, the second intermediate data are copied from the destination physical address of the destination physical memory 922 to obtain the target data 924 at the destination address.

While examples of the method according to the present disclosure have been described in detail with reference to FIGS. 2 to 10, now a detailed description is presented below to embodiments of a corresponding apparatus with reference to FIGS. 11A and 11B. FIG. 11A schematically shows a block diagram of an apparatus 1100A for managing addresses in a distributed system according to one example embodiment of the present disclosure. The distributed system comprises a client and a resource pool, the resource pool comprising multiple hosts, a host among the multiple hosts comprising a computing node.

The apparatus 1100A comprises: a receiving module 1110A configured to receive an access request from the client, the access request being for accessing first target data in a physical memory of the computing node via a first virtual address; a first determining module 1120A configured to determine the physical memory on the basis of the first virtual address; and a second determining module 1130A configured to determine a first physical address of the first target data in the physical memory on the basis of the first virtual address, wherein the computing node is a GPU, and the physical memory is a memory of the GPU. The apparatus 1100A here may be configured to execute various steps in the method 400 described above, which is not detailed.

FIG. 11B schematically shows a block diagram of an apparatus 1100B for processing a copy request according to one example embodiment of the present disclosure. The apparatus 1100B comprises: an address determining module 1110B configured to, in response to receiving a copy request from a client, determine a source virtual address and a destination virtual address which are associated with the copy request; a physical address determining module 1120B configured to, by using the apparatus 1100A as shown in FIG. 11A, determine a source physical memory and a source physical address on the basis of the source virtual address and determine a destination physical memory and a destination physical address on the basis of the destination virtual address; and a processing module 1130B configured to process the copy request on the basis of the source physical memory and the destination physical memory. The apparatus 1100B here may be configured to execute various steps in the method 700 described above, which is not detailed.

Figure 12:
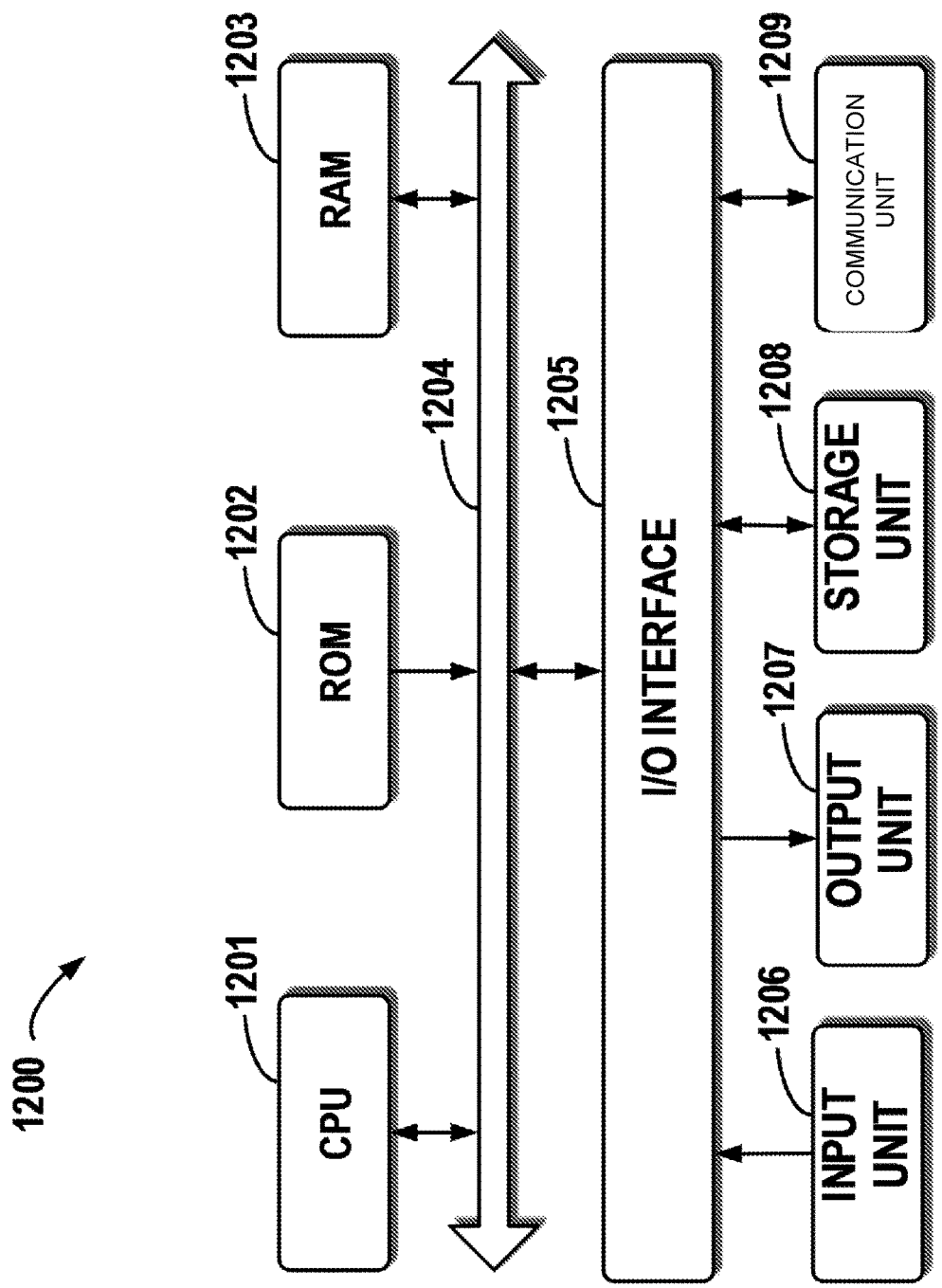
FIG. 12 schematically shows a block diagram of an apparatus for managing addresses in a distributed system and processing a copy request according to one example embodiment of the present disclosure.

FIG. 12 schematically shows a block diagram of an apparatus 1200 for managing addresses in a distributed system and processing a copy request according to one example embodiment of the present disclosure. As depicted, the apparatus 1200 includes a central process unit (CPU) 1201, which can execute various suitable actions and processing based on the computer program instructions stored in the read-only memory (ROM) 1202 or computer program instructions loaded in the random-access memory (RAM) 1203 from a storage unit 1208. The RAM 1203 can also store all kinds of programs and data required by the operations of the apparatus 1200. CPU 1201, ROM 1202 and RAM 1203 are connected to each other via a bus 1204. The input/output (I/O) interface 1205 is also connected to the bus 1204.

A plurality of components in the apparatus 1200 is connected to the I/O interface 1205, including: an input unit 1206, such as keyboard, mouse and the like; an output unit 1207, e.g., various kinds of display and loudspeakers etc.; a storage unit 1208, such as magnetic disk and optical disk etc.; and a communication unit 1209, such as network card, modem, wireless transceiver and the like. The communication unit 1209 allows the apparatus 1200 to exchange information/data with other devices via the computer network, such as Internet, and/or various telecommunication networks.

The above described each process and treatment, such as the methods 400 and 700, can also be executed by the processing unit 1201. For example, in some embodiments, the methods 400 and 700 can be implemented as a computer software program tangibly included in the machine-readable medium, e.g., the storage unit 1208. In some embodiments, the computer program can be partially or fully loaded and/or mounted to the apparatus 1200 via ROM 1202 and/or the communication unit 1209. When the computer program is loaded to the RAM 1203 and executed by the CPU 1201, one or more steps of the above described methods 400 and 700 can be implemented. Alternatively, in other embodiments, the CPU 1201 also can be configured in other suitable manners to realize the above procedure/method.

According to one example embodiment of the present disclosure, there is provided an apparatus for managing addresses in a distributed system, the distributed system comprising a client and a resource pool, the resource pool comprising multiple hosts, a host among the multiple hosts comprising a computing node. The apparatus comprises: at least one processor; a volatile memory; and a memory coupled to the at least one processor, the memory having instructions stored thereon, the instructions, when executed by the at least one processor, causing the apparatus to perform acts. The acts include: receiving an access request from the client, the access request being for accessing first target data in a physical memory of the computing node via a first virtual address; determining the physical memory on the basis of the first virtual address; and determining a first physical address of the first target data in the physical memory on the basis of the first virtual address, wherein the computing node is a graphics processing unit, and the physical memory is a memory of the graphics processing unit.

According to one example embodiment of the present disclosure, determining the physical memory on the basis of the first virtual address comprises: determining, on the basis of a predefined address mapping, an address range to which the first virtual address belongs, the address mapping comprising a mapping relationship between the physical memory and the address range; and determining the physical memory on the basis of the address range.

According to one example embodiment of the present disclosure, determining the first physical address comprises: determining the first physical address on the basis of an offset of the first virtual address within the address range.

According to one example embodiment of the present disclosure, the acts further comprise: receiving a feedback result from the physical memory, the feedback result defining second target data at a second physical address in the physical memory; and determining a second virtual address on the basis of the predefined address mapping, the physical memory and the second physical address so as to be returned to the client.

According to one example embodiment of the present disclosure, determining the second virtual address comprises: determining a start address of an address range associated with the physical memory according to the address mapping; and determining the second virtual address by offsetting the second physical address on the basis of the start address.

According to one example embodiment of the present disclosure, the access request is a remote procedure call of the graphics processing unit from the client.

According to one example embodiment of the present disclosure, there is provided an apparatus for processing a copy request, comprising: at least one processor; an apparatus for managing addresses in a distributed system; a volatile memory; and a memory coupled to the at least one processor, the memory having instructions stored thereon, the instructions, when executed by the at least one processor, causing the apparatus to perform acts. The acts include: in response to receiving a copy request from a client, determining a source virtual address and a destination virtual address which are associated with the copy request; by using the apparatus for managing addresses in a distributed system, determining a source physical memory and a source physical address on the basis of the source virtual address and determining a destination physical memory and a destination physical address on the basis of the destination virtual address; and processing the copy request on the basis of the source physical memory and the destination physical memory.

According to one example embodiment of the present disclosure, processing the copy request on the basis of the source physical memory and the destination physical memory comprises: in response to determining that the source physical memory and the destination physical memory are same, at the source physical memory copying target data associated with the copy request from the source physical address to the destination physical address.

According to one example embodiment of the present disclosure, processing the copy request on the basis of the source physical memory and the destination physical memory comprises: in response to determining that the source physical memory and the destination physical memory are different, determining a connection state between a source host where the source physical memory resides and a destination host where the destination physical memory resides; and processing the copy request on the basis of the connection state.

According to one example embodiment of the present disclosure, processing the copy request on the basis of the connection state comprises: in response to determining that there exists a direct connection between the source host and the destination host, copying target data associated with the copy request from the source physical address in the source physical memory to a memory in the source host so as to form first intermediate data; copying the intermediate data via the direct connection to a memory in the destination host so as to form second intermediate data; and copying the second intermediate data to the destination physical address in the destination physical memory.

According to one example embodiment of the present disclosure, processing the copy request on the basis of the connection state comprises: in response to determining that there exists no direct connection between the source host and the destination host, copying target data associated with the copy request from the source physical address in the source physical memory to the client so as to form intermediate data; and copying the intermediate data to the destination physical address in the destination physical memory.

According to one example embodiment of the present disclosure, copying the target data from the source physical address in the source physical memory to the client so as to form intermediate data comprises: copying the target data from the source physical address in the source physical memory to a memory in the source host so as to form first intermediate data; and copying the first intermediate data to the client.

According to one example embodiment of the present disclosure, copying the intermediate data to the destination physical address in the destination physical memory comprises: copying the intermediate data from the client to a memory in the destination host so as to form second intermediate data; and copying the second intermediate data to the destination physical address in the destination physical memory.

According to one example embodiment of the present disclosure, there is provided a computer program product. The computer program product is tangibly stored on a computer readable medium and comprises machine executable instructions which, when executed, cause a machine to implement the method according to the present disclosure.

According to one example embodiment of the present disclosure, there is provided a computer readable medium. The computer readable medium is stored with machine executable instructions thereon, the machine executable instructions, when executed by at least one processor, causing the at least one processor to implement the method according to the present disclosure.

The present disclosure can be a method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro codes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to a flow chart and/or a block diagram of a method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple embodiments of the present disclosure. In this regard, each block in the flow chart or block diagram can represent a module, a part of program segment or code, wherein the module and the part of program segment or code include one or more executable instructions for performing stipulated logic functions. In some alternative embodiments, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable other ordinary skilled in the art to understand embodiments of the present disclosure.

What is claimed is:

1. A method for managing addresses in a distributed system, the distributed system comprising a client and a resource pool, the resource pool comprising multiple hosts, a host among the multiple hosts comprising a computing node, the method comprising:

receiving an access request from the client, the access request being for accessing first target data in a physical memory of the computing node via a first virtual address;

determining the physical memory on the basis of the first virtual address comprising determining, on the basis of a predefined address mapping, an address range to which the first virtual address belongs, the address mapping comprising a mapping relationship between the physical memory and the address range; and determining the physical memory on the basis of the address range;

determining a first physical address of the first target data in the physical memory on the basis of the first virtual address comprising determining the first physical address on the basis of an offset of the first virtual address within the address range;

receiving a feedback result from the physical memory, the feedback result defining second target data at a second physical address in the physical memory; and determining a second virtual address on the basis of the predefined address mapping, the physical memory and the second physical address so as to be returned to the client, wherein the computing node is a graphics processing unit, and the physical memory is a memory of the graphics processing unit.

2. The method of claim 1, wherein determining the second virtual address comprises:

determining a start address of an address range associated with the physical memory according to the address mapping; and determining the second virtual address by offsetting the second physical address on the basis of the start address.

3. The method of claim 1, wherein the access request is a remote procedure call of the graphics processing unit from the client.

4. The method of claim 1, further comprising processing a copy request.

5. The method of claim 4, wherein processing the copy request further comprises:
  in response to receiving a copy request from a client, determining a source virtual address and a destination virtual address which are associated with the copy request;
  determining a source physical memory and a source physical address on the basis of the source virtual address and determining a destination physical memory and a destination physical address on the basis of the destination virtual address; and
  processing the copy request on the basis of the source physical memory and the destination physical memory.

6. The method of claim 5, wherein processing the copy request on the basis of the source physical memory and the destination physical memory comprises:
  in response to determining that the source physical memory and the destination physical memory are same, at the source physical memory copying target data associated with the copy request from the source physical address to the destination physical address.

7. The method of claim 4, wherein processing the copy request on the basis of the source physical memory and the destination physical memory comprises:
  in response to determining that the source physical memory and the destination physical memory are different, determining a connection state between a source host where the source physical memory resides and a destination host where the destination physical memory resides; and
  processing the copy request on the basis of the connection state.

8. The method of claim 7, wherein processing the copy request on the basis of the connection state comprises: in response to determining that there exists a direct connection between the source host and the destination host,
  copying target data associated with the copy request from the source physical address in the source physical memory to a memory in the source host so as to form first intermediate data;
  copying the intermediate data via the direct connection to a memory in the destination host so as to form second intermediate data; and
  copying the second intermediate data to the destination physical address in the destination physical memory.

9. The method according to claim 7, wherein processing the copy request on the basis of the connection state comprises: in response to determining that there exists no direct connection between the source host and the destination host,
  copying target data associated with the copy request from the source physical address in the source physical memory to the client so as to form intermediate data; and
  copying the intermediate data to the destination physical address in the destination physical memory.

10. The method according to claim 9, wherein copying the target data from the source physical address in the source physical memory to the client so as to form intermediate data comprises:
  copying the target data from the source physical address in the source physical memory to a memory in the source host so as to form first intermediate data; and
  copying the first intermediate data to the client.

11. The method according to claim 9, wherein copying the intermediate data to the destination physical address in the destination physical memory comprises:
  copying the intermediate data from the client to a memory in the destination host so as to form second intermediate data; and
  copying the second intermediate data to the destination physical address in the destination physical memory.

12. A computer program product, tangibly stored on a non-transitory computer readable medium and comprising machine executable instructions which, when executed, cause a machine to implement a method for managing addresses in a distributed system, the distributed system comprising a client and a resource pool, the resource pool comprising multiple hosts, a host among the multiple hosts comprising a computing node, the method comprising:
  receiving an access request from the client, the access request being for accessing first target data in a physical memory of the computing node via a first virtual address;
  determining the physical memory on the basis of the first virtual address comprising determining, on the basis of a predefined address mapping, an address range to which the first virtual address belongs, the address mapping comprising a mapping relationship between the physical memory and the address range; and determining the physical memory on the basis of the address range;
  determining a first physical address of the first target data in the physical memory on the basis of the first virtual address comprising determining the first physical address on the basis of an offset of the first virtual address within the address range;
  receiving a feedback result from the physical memory, the feedback result defining second target data at a second physical address in the physical memory; and
  determining a second virtual address on the basis of the predefined address mapping, the physical memory and the second physical address so as to be returned to the client.

13. An apparatus for managing addresses in a distributed system, the distributed system comprising a client and a resource pool, the resource pool comprising multiple hosts, a host among the multiple hosts comprising a computing node, the apparatus comprising:
  at least one processor;
  a volatile memory; and
  a memory coupled to the at least one processor and having instructions stored thereon, the instructions, when executed by the at least one processor, causing the apparatus to perform acts comprising:
    receiving an access request from the client, the access request being for accessing first target data in a physical memory of the computing node via a first virtual address;
    determining the physical memory on the basis of the first virtual address comprising determining, on the basis of a predefined address mapping, an address range to which the first virtual address belongs, the address mapping comprising a mapping relationship between the physical memory and the address range; and determining the physical memory on the basis of the address range;
    determining a first physical address of the first target data in the physical memory on the basis of the first virtual address comprising determining the first physical address on the basis of an offset of the first virtual address within the address range;

receiving a feedback result from the physical memory, the feedback result defining second target data at a second physical address in the physical memory; and determining a second virtual address on the basis of the predefined address mapping, the physical memory and the second physical address so as to be returned to the client.

14. The apparatus of claim 13, wherein the apparatus further performs acts comprising processing a copy request.

15. The computer program product of claim 12, wherein determining the second virtual address comprises:

determining a start address of an address range associated with the physical memory according to the address mapping; and determining the second virtual address by offsetting the second physical address on the basis of the start address.

16. The computer program product of claim 12, wherein the access request is a remote procedure call of the graphics processing unit from the client.

17. The apparatus of claim 13, wherein determining the second virtual address comprises:

determining a start address of an address range associated with the physical memory according to the address mapping; and determining the second virtual address by offsetting the second physical address on the basis of the start address.

18. The apparatus of claim 13, wherein the access request is a remote procedure call of the graphics processing unit from the client.

19. The apparatus of claim 14, wherein processing the copy request further comprises:

in response to receiving a copy request from a client, determining a source virtual address and a destination virtual address which are associated with the copy request;

determining a source physical memory and a source physical address on the basis of the source virtual address and determining a destination physical memory and a destination physical address on the basis of the destination virtual address; and processing the copy request on the basis of the source physical memory and the destination physical memory.

20. An apparatus for managing addresses in a distributed system, the distributed system comprising a client and a resource pool, the resource pool comprising multiple hosts, a host among the multiple hosts comprising a computing node, the apparatus comprising:

at least one processor;

a volatile memory; and a memory coupled to the at least one processor and having instructions stored thereon, the instructions, when executed by the at least one processor, causing the apparatus to perform acts comprising:

receiving an access request from the client, the access request being for accessing first target data in a physical memory of the computing node via a first virtual address;

determining the physical memory on the basis of the first virtual address;

determining a first physical address of the first target data in the physical memory on the basis of the first virtual address; and processing a copy request;

wherein processing the copy request on the basis of the source physical memory and the destination physical memory comprises:

in response to determining that the source physical memory and the destination physical memory are different, determining a connection state between a source host where the source physical memory resides and a destination host where the destination physical memory resides; and processing the copy request on the basis of the connection state; and wherein processing the copy request on the basis of the connection state comprises:

in response to determining that there exists a direct connection between the source host and the destination host, copying target data associated with the copy request from the source physical address in the source physical memory to a memory in the source host so as to form first intermediate data;

copying the intermediate data via the direct connection to a memory in the destination host so as to form second intermediate data; and copying the second intermediate data to the destination physical address in the destination physical memory.

* * * * *